May 26, 1931.  F. M. HAWLEY  1,806,901
TIGHTENER FOR FLEXIBLE DRIVE CONNECTIONS
Filed Dec. 27, 1926  3 Sheets-Sheet 1

Inventor
Frank M. Hawley
By Whittemore Hulbert
Whittemore Belknap
Attorney's

May 26, 1931. F. M. HAWLEY 1,806,901
TIGHTENER FOR FLEXIBLE DRIVE CONNECTIONS
Filed Dec. 27, 1926 3 Sheets-Sheet 2

Inventor
Frank M. Hawley
By Whittemore Hulbert
Whittemore & Belknap
Attorneys

May 26, 1931. F. M. HAWLEY 1,806,901
TIGHTENER FOR FLEXIBLE DRIVE CONNECTIONS
Filed Dec. 27, 1926 3 Sheets-Sheet 3
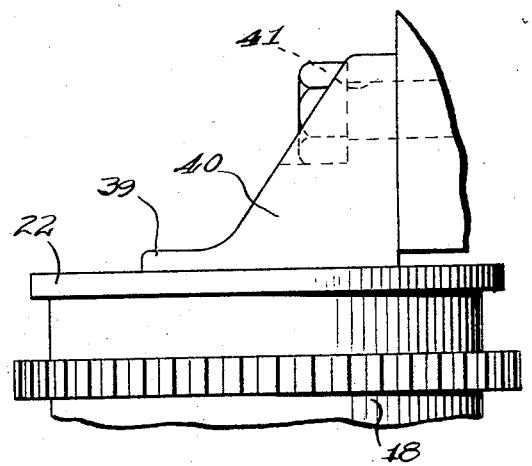
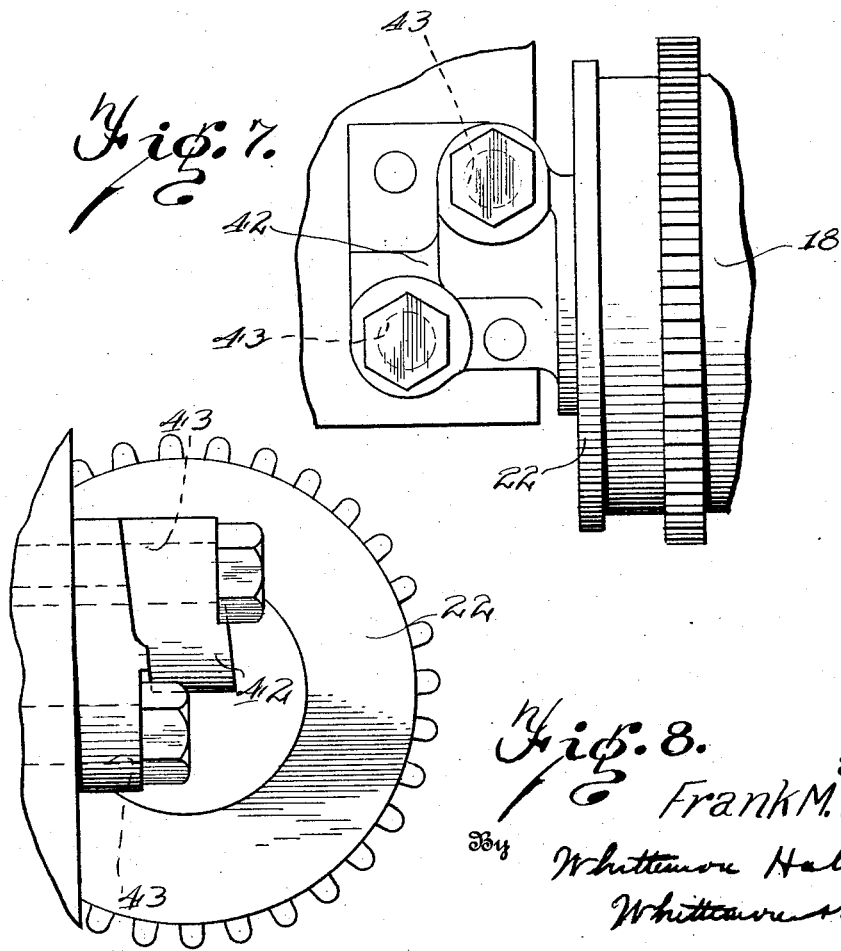
Inventor
Frank M. Hawley
By Whittemore Hulbert
Whittemore & Belknap
Attorney's Patented May 26, 1931

1,806,901

UNITED STATES PATENT OFFICE

FRANK M. HAWLEY, OF DETROIT, MICHIGAN, ASSIGNOR TO MORSE CHAIN COMPANY, OF ITHACA, NEW YORK, A CORPORATION OF NEW YORK

TIGHTENER FOR FLEXIBLE DRIVE CONNECTIONS

Application filed December 27, 1926. Serial No. 157,401.

The invention relates to tighteners for flexible drive connections such as chains, belts and the like and is particularly applicable to tighteners for drive chains used in conjunction with the timing mechanisms of internal combustion engines; but it will be understood that the invention is applicable to tighteners for use in other machines without departing from the essential features of the invention. One of the objects of the invention is to provide an improved construction of tightener in which the member engageable with the flexible drive connection is automatically moved in one direction and automatically held from movement in the opposite direction so that the flexible drive connection may be properly tensioned to take up its slack. Another object of the invention is to provide a compact construction of tightener which may be readily applied to the machine with which it is to be used. With these as well as other objects in view, the invention resides in the novel features of construction and combinations and arrangements of parts as more fully hereinafter set forth.

In the drawings:—

Figure 1:
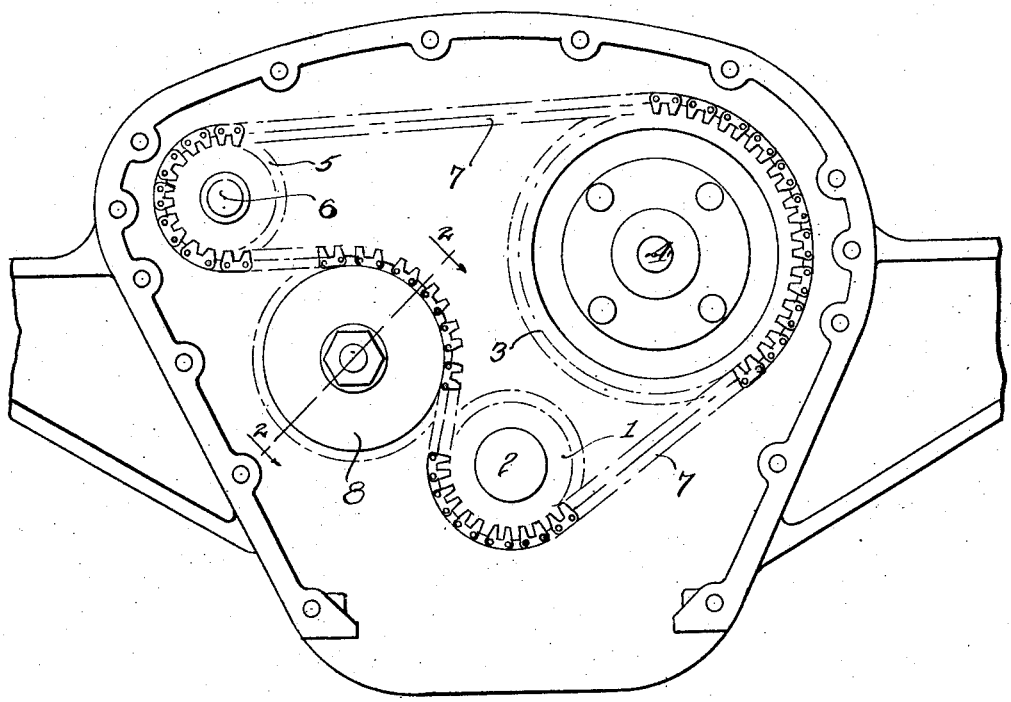
Figure 1 is an end view of a portion of an internal combustion engine, showing a timing mechanism including a chain tightener embodying my invention.
Figure 5:
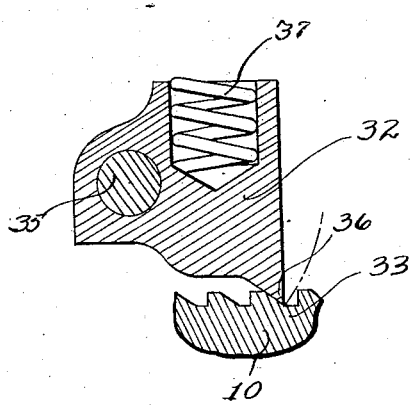
Figure 2:
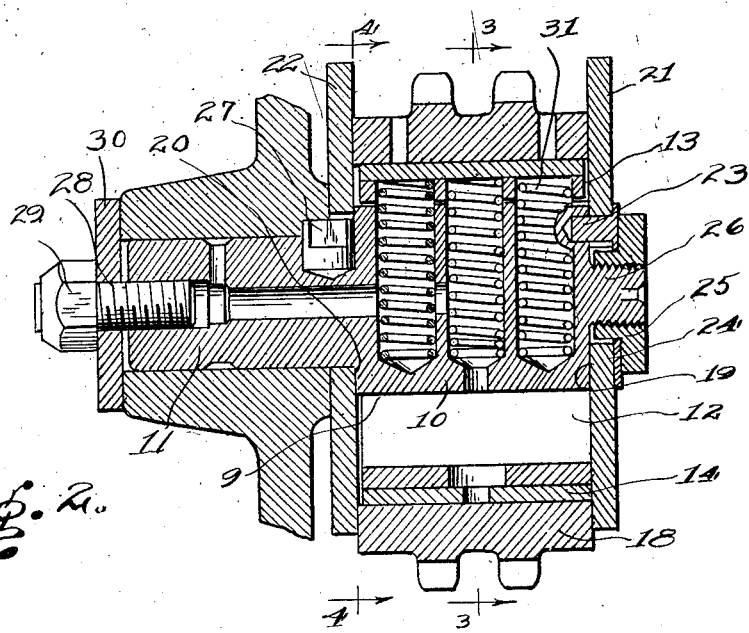
Figure 2 is a cross section on the line 2—2 of Figure 1.
Figure 3:
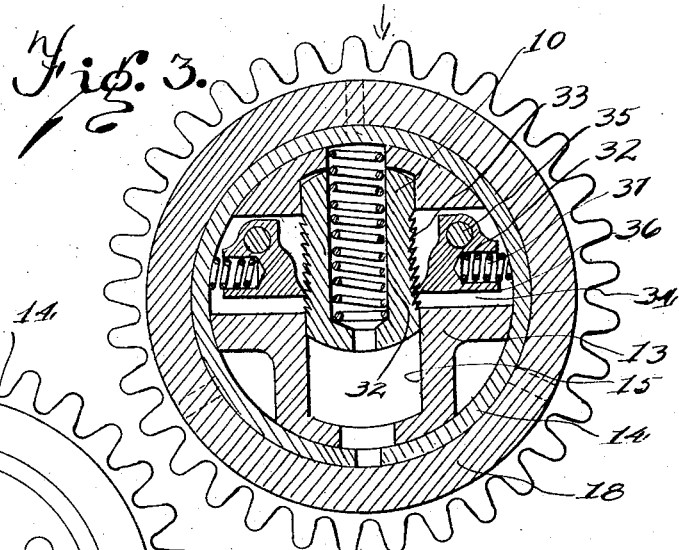
Figure 4:
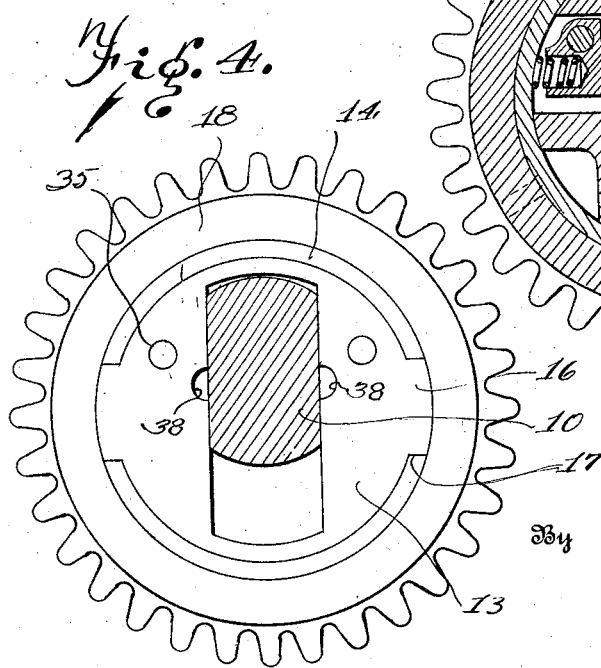

Figures 3 and 4 are cross sections on the lines 3—3 and 4—4 respectively of Figure 2;

Figure 5 is an enlarged view of part of Figure 3;

Figures 6 and 7 are side elevations showing modified chain tighteners;

Figure 8 is a rear end view of Figure 7.

In the present instance I have shown the chain tightener in conjunction with the timing mechanism of an internal combustion engine in which 1 is the drive sprocket mounted upon the engine crank shaft 2, 3 is a driven sprocket secured to the engine cam shaft 4, 5 is another driven sprocket secured to the auxiliary shaft 6 for driving suitable mechanism such as a water pump, a generator or the like, and 7 is the sprocket chain extending around these sprockets. To provide for using the chain tightener with this type of drive the chain is of the duplex type although it is obvious that the chain tightener may be used with a single face engagement chain and placed to operate at any convenient position.

8 is the chain tightener positioned to operate in the idle portion of the chain which is located between the drive sprocket 1 and the driven sprocket 5. This device is constructed to automatically take up slack in the chain, to provide a stationary support cooperating with the chain, and at the same time to provide for the necessary contraction of the chain upon change of temperature. In detail, 9 is the support of the chain tightener having a body 10 with parallel sides and the integral stud 11, which latter is rigidly mounted upon the chain housing in the present instance, this housing being rigid with the crank case of the engine. 12 is a bearing mounted upon the support and comprising the slide 13 and the bushing 14. The slide 13 is provided with the diametrically extending slot 15 the sides of which are engageable with the parallel sides of the support body 10. This slide also has a cylindrical outer face which is engaged by the bushing, the latter being held from rotation relative to the former by means of the lugs 16 extending radially outward from the slide at one end thereof and engaging in slots 17 formed in one end of the bushing. 18 is the sprocket of the chain tightener journaled upon the bushing and forming an idler sprocket for engagement with the chain.

To hold the parts from relative endwise movement, the support body 10 is provided at its front and rear ends with the shoulders 19 and 20 respectively against which the front and rear thrust washers 21 and 22 respectively are clamped. The distance between these shoulders is slightly greater than the widths of the slide, bushing and sprocket so that the slide and bushing comprising the bearing may more freely move relative to the support and the sprocket may more freely rotate relative to the bearing. The front thrust washer 21 is held from rotation relative to the support by means of the transverse pin 23 upon the washer 24 and extending through the thrust washer into the front end of the support body 10. This washer and thrust washer are clamped against this end of the support body by means of the nut 25 which is threaded upon a reduced portion 26 of the support body and extends within the thrust washer. The rear thrust washer 22 is held from rotation relative to the support as by means of the key 27 secured to the stud 11 and engaging in a key way in this bearing plate. This key also engages in a key way in the chain housing to hold the support from rotation relative to the housing and in a position so that the bearing and the sprocket carried thereby are movable relative to the support at right angles to the tangent of the idle portion of the chain. The rear thrust washer 22 is clamped against the rear end of the support body 10 by suitable means such as the stud 28 threaded into the support stud 11, the nut 29 threaded upon this stud and the clamping plate 30 engaged by the nut and abutting the rear side of the chain housing.

For automatically moving the bearing to take up slack in the chain, I have provided the coil springs 31 which extend into bores in the support body 10 and through the slide 13, the inner ends of these springs abutting the ends of the bores and their outer ends abutting the bushing 14. For automatically limiting the movement of the bearing in the opposite direction, I have provided the latches 32 for engaging shoulders formed by the teeth 33 upon the parallel sides of the support body 10. Each latch is located within the transverse slot 34 formed in the slide 13 and is pivotally mounted upon the pin 35 extending longitudinally of the slide. To yieldably force the nose 36 of each latch toward the support to engage the teeth at that side of the support, I have provided the coil spring 37 extending within a bore in the latch and having its outer end engageable with the bushing 14. The shoulders formed by the teeth 33 at one side of the support body alternate with the shoulders formed by the teeth at the other side and but one latch is adapted to function at any one time, thereby providing for more closely holding the slide from moving relative to the support. However, and as shown particularly in Figure 5, each latch is so mounted that when the slide has been forced outwardly relative to the support the nose of the particular latch engageable with the shoulder formed by the adjacent tooth clears this tooth and normally occupies a position slightly spaced from the shoulder so that the slide may have a slight return movement relative to the support, thereby allowing for contraction of the chain under temperature changes.

With the above arrangement it will be seen that when the engine is at rest the coil springs 31 will automatically force the bearing and the sprocket carried thereby outwardly relative to the support to take up slack in the chain and that either latch has its nose in position to engage the shoulder of the adjacent tooth upon return movement of the bearing and sprocket relative to the support. Upon starting the engine, the tension of the chain becomes greater and tends to force the bearing and sprocket carried thereby in the return direction, but this return movement is prevented by the operative latch. As the chain wears, the bearing and sprocket carried thereby are automatically forced outwardly to take care of the wear and the latches function alternately to prevent return movement. It will also be seen that when the engine is at rest slight return movement of the bearing and sprocket carried thereby is provided for to take care of contraction of the chain by change in temperature, thereby avoiding subjecting the chains to too great tension.

To permit of readily assembling the automatic chain tightener with the chain, I have provided the recesses 38 in one end of the slide 13 and opening into its slot 15 and extending to the transverse recesses 34 so that a suitable tool may be inserted through these recesses to engage the latches 32 and force their noses away from the support body 10, after which the support body may be moved relative to the bearing including the slide 13 and bushing 14 to compress the coil springs 31. A suitable block may be then inserted between the support body and the bearing to hold the parts in this position while securing the chain tightener in place. After the chain tightener has been placed in operative relation to the chain, the block may then be removed and the coil springs 31 will automatically force the bearing and the sprocket carried thereby to a position to take up slack in the chain.

As shown in Figures 6, 7 and 8, the supports of the chain tighteners may be mounted in different ways. Figure 6 shows the chain tightener support 39 as having a flanged extension 40 upon its body and preferably integral therewith, this flanged extension being provided with suitable transverse openings 41 through which extends the means for securing the support to the chain housing, crank case or other suitable part of the machine. Figures 7 and 8 also show flanged extension 42 upon and preferably integral with its body and provided with transverse openings 43 therethrough for engagement by the means for securing the support to the chain housing, crank case or other part of the machine. In both of these modifications the rear thrust washer may be secured from rotation relative to the body by suitable means such as radial projections or keys upon the rear end of the body engaging in key ways in the washer.

What I claim as my invention is:

1. In an automatic chain tightener, the combination with a support, of a sprocket journalled upon said support, means for automatically effecting a rectilinear movement of said sprocket in one direction relative to said support, and means for automatically holding said sprocket from movement in the opposite direction relative to said support.

2. In an automatic chain tightener, the combination with a support, of a bearing mounted upon said support, a sprocket mounted upon said bearing, means between said support and bearing for automatically moving said bearing in one direction relative to said support, and means upon one of said members and engageable with the other for automatically holding said bearing from movement in the opposite direction relative to said support.

3. In an automatic chain tightener, the combination with a support, of a bearing mounted upon said support, a sprocket rotatably mounted upon said bearing, means for automatically moving said bearing in one direction relative to said support, including a spring between said bearing and support, and means for automatically holding said bearing from movement in the opposite direction relative to said support, including a latch mounted upon one of said members and engaging the other.

4. In an automatic chain tightener, the combination with a support, of a bearing mounted upon said support to move transversely thereof, said bearing including a slide engaging said support and a bushing surrounding said slide, a sprocket rotatably mounted upon said bushing, means for automatically moving said bearing in one direction relative to said support, including a coil spring extending through said slide and abutting said support and bushing, and means for automatically holding said bearing from movement in the opposite direction relative to said support, including a latch pivotally mounted upon said slide and engageable with said support, and means for resiliently forcing said latch into engagement with said support.

5. In an automatic chain tightener, the combination with a support, of a bearing mounted upon said support to move transversely thereof, said bearing including a slide engaging said support and a cylindrical bushing surrounding said slide, a sprocket rotatably mounted upon said bushing, means for automatically moving said bearing in one direction relative to said support, including a coil spring extending through said slide and abutting said support and bushing, and means for automatically holding said bearing from movement in the opposite direction relative to said support, including latches pivotally mounted upon said slide at opposite sides of said support, staggered teeth upon the opposite sides of said support, and coil springs abutting said latches and bushing for yieldably forcing said latches to engage their respective teeth.

6. In an automatic chain tightener, the combination with a support provided with a shoulder, of a bearing movably mounted upon said support, a sprocket mounted upon said bearing, means for automatically moving said bearing in one direction relative to said support and a latch mounted upon said bearing and having a nose positioned to engage said shoulder upon movement of said bearing in the opposite direction relative to said support, said nose being normally spaced from said shoulder to permit limited movement of said bearing.

7. In an automatic chain tightener, the combination with a support, of a sprocket journalled upon said support, means for automatically effecting a rectilinear movement of said sprocket in one direction relative to said support, and positive means providing for limited movement of said sprocket in the opposite direction relative to said support and automatically operating to limit said movement.

8. In a tightener for a flexible drive connection, the combination with a support provided with a shoulder, of a bearing movably mounted upon said support, a revoluble member mounted upon said bearing, means for automatically moving said bearing in one direction relative to said support, and a latch pivotally mounted upon said bearing and having a nose adapted to clear said shoulder upon swinging of said latch and positioned to engage said shoulder upon movement of said bearing in the opposite direction relative to said support, said nose being normally spaced from said shoulder to permit limited movement of said bearing.

9. In an automatic chain tightener, the combination with a support, of a bearing mounted upon said support, a chain engaging member rotatably mounted upon said bearing, means for automatically moving said bearing in one direction relative to said support, and means for automatically limiting the movement of said sprocket in the opposite direction relative to said support, said first mentioned means exerting a force in a direction parallel to the direction of movement of the sprocket.

10. In an automatic chain tightener, the combination with a support, of a sprocket mounted upon said support, means in said support for automatically effecting a rectilinear movement of said sprocket in one direction relative to said support, and positive means for automatically limiting the movement of said sprocket in the opposite direction relative to said support.

11. In an automatic chain tightener, the combination with a support, of a sprocket mounted upon said support, means for guiding said sprocket in a rectilinear path relative to said support, spring means between said support and said sprocket acting in the same direction as said rectilinear path and means for automatically holding said sprocket from movement in the opposite direction.

12. In an automatic chain tightener, the combination with a support, of a member mounted upon said support, means for guiding said member in a rectilinear path relative to said support, spring means between said support and said member acting in the same direction as said rectilinear path and means providing for limited movement of said member in the opposite direction relative to said support and automatically operating to limit said movement.

In testimony whereof I affix my signature.

FRANK M. HAWLEY.